US 6,556,322 B1

(12) United States Patent
Desurvire

(10) Patent No.: US 6,556,322 B1
(45) Date of Patent: Apr. 29, 2003

(54) METHOD OF DETECTING ONE OR MORE FREE CHANNELS IN AN OPTICAL TIME-DIVISION MULTIPLEX, A DEVICE FOR IMPLEMENTING IT AND THE USE OF THE DEVICE

(75) Inventor: Emmanuel Desurvire, Bruyères le Châtel (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/240,589

(22) Filed: Feb. 1, 1999

(30) Foreign Application Priority Data

Feb. 2, 1998 (FR) .......................................... 98 01138

(51) Int. Cl.⁷ ............................................. H04J 14/08
(52) U.S. Cl. ...................... 359/135; 359/110; 359/123; 359/127; 359/140; 359/161; 359/174
(58) Field of Search ................................ 359/110, 123, 359/135, 140, 161, 174, 127

(56) References Cited

U.S. PATENT DOCUMENTS

| 5,271,034 A | * | 12/1993 | Abaunza | 342/357.12 |
| 5,786,913 A | * | 7/1998 | Pfeiffer | 359/119 |
| 5,898,801 A | * | 4/1999 | Braun et al. | 359/119 |
| 6,078,418 A | * | 6/2000 | Hansen et al. | 359/130 |
| 6,091,539 A | * | 7/2000 | Kosaka | 359/124 |
| 6,400,476 B1 | * | 6/2002 | Arecco | 359/110 |

FOREIGN PATENT DOCUMENTS

| EP | 0 385 430 A2 | 9/1990 |
| WO | WO 97/31443 | 8/1997 |

OTHER PUBLICATIONS

Fujimoto, N: "Consideration of Optical Channel Number and Date/Frame Phase Tolerance for the Photonic Ring Highway" Photonic Switching, Kobe, Apr. 12–14, 1990, pp. 378–381, XP000333192.

Spirit, D. M., et al.: "Optical Time Division Multiplexing for Future High–Capacity Network Applications" BT Technology Journal, vol. 11, No. 2, Apr. 1, 1993, pp. 35–45, XP000534135.

Ellis, A.D. et al.: "690 Node Global OTDM Network Demonstration" Electronic Letters, vol. 31, No. 14, Jul. 6, 1995, pp. 1171–1172, XP000525330.

* cited by examiner

Primary Examiner—Leslie Pascal
Assistant Examiner—Dzung Tran
(74) Attorney, Agent, or Firm—Sughrue Mion, PLLC

(57) ABSTRACT

A method of detecting one or more free channels in a time-division multiplexed optical signal which may be used for insertion signals in switching nodes of optical communication networks. The method includes sampling successive optical pulses from at least one of said channels, measuring the average optical power of the sampled pulses during a predetermined time period, and generating a detection signal if said average optical power is less than or equal to a predetermined threshold value.

18 Claims, 3 Drawing Sheets

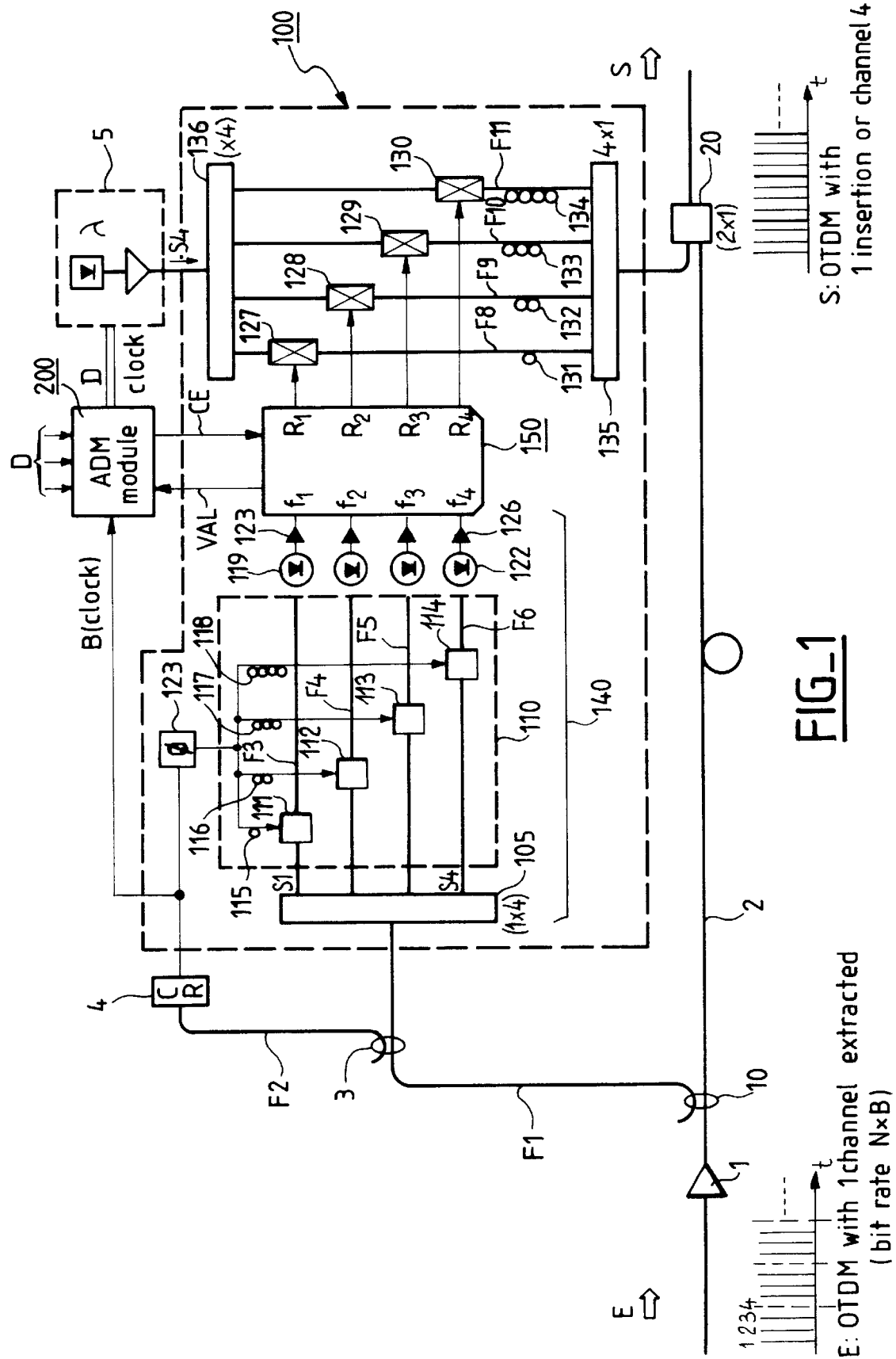
FIG_1

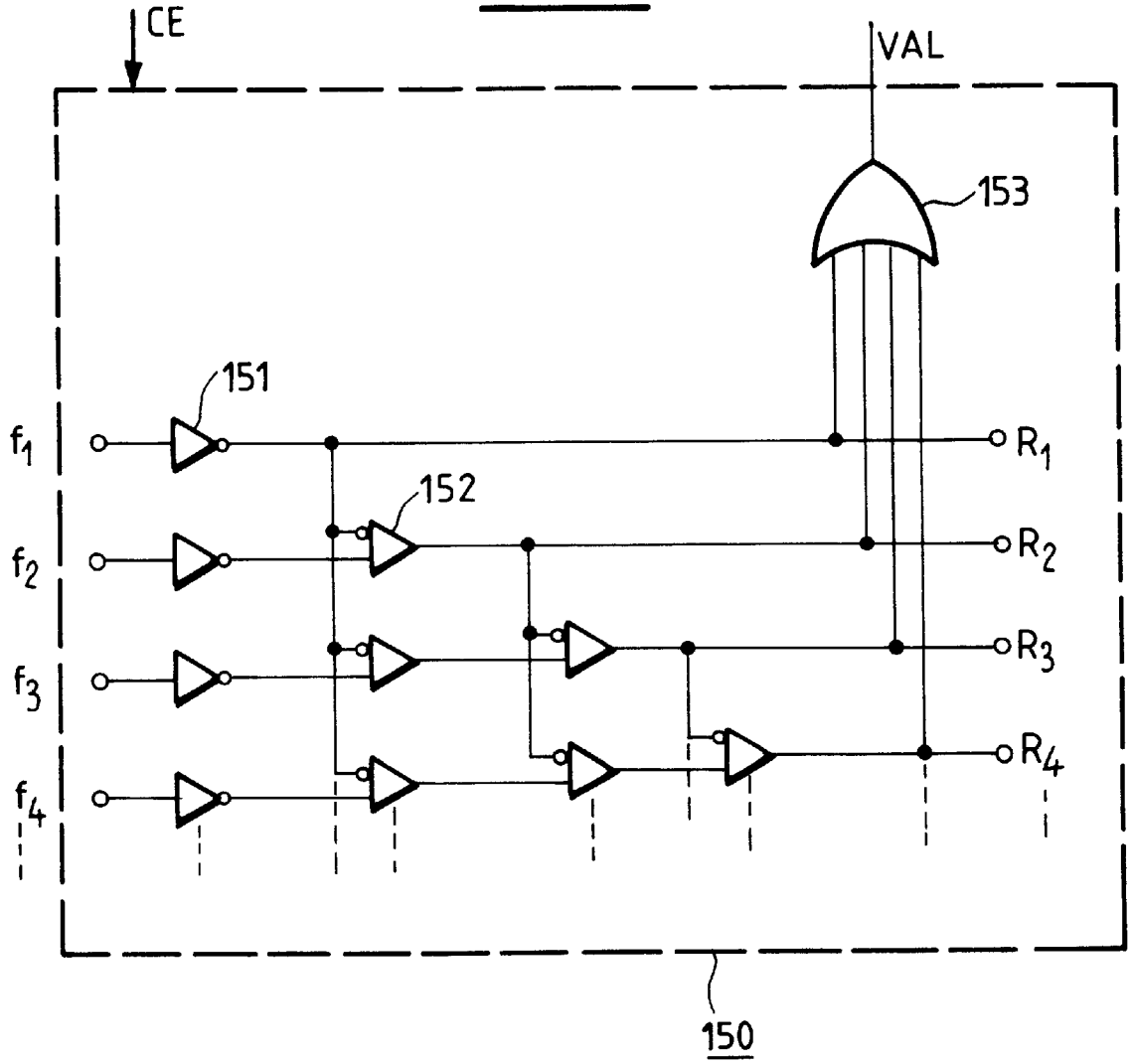
FIG_2

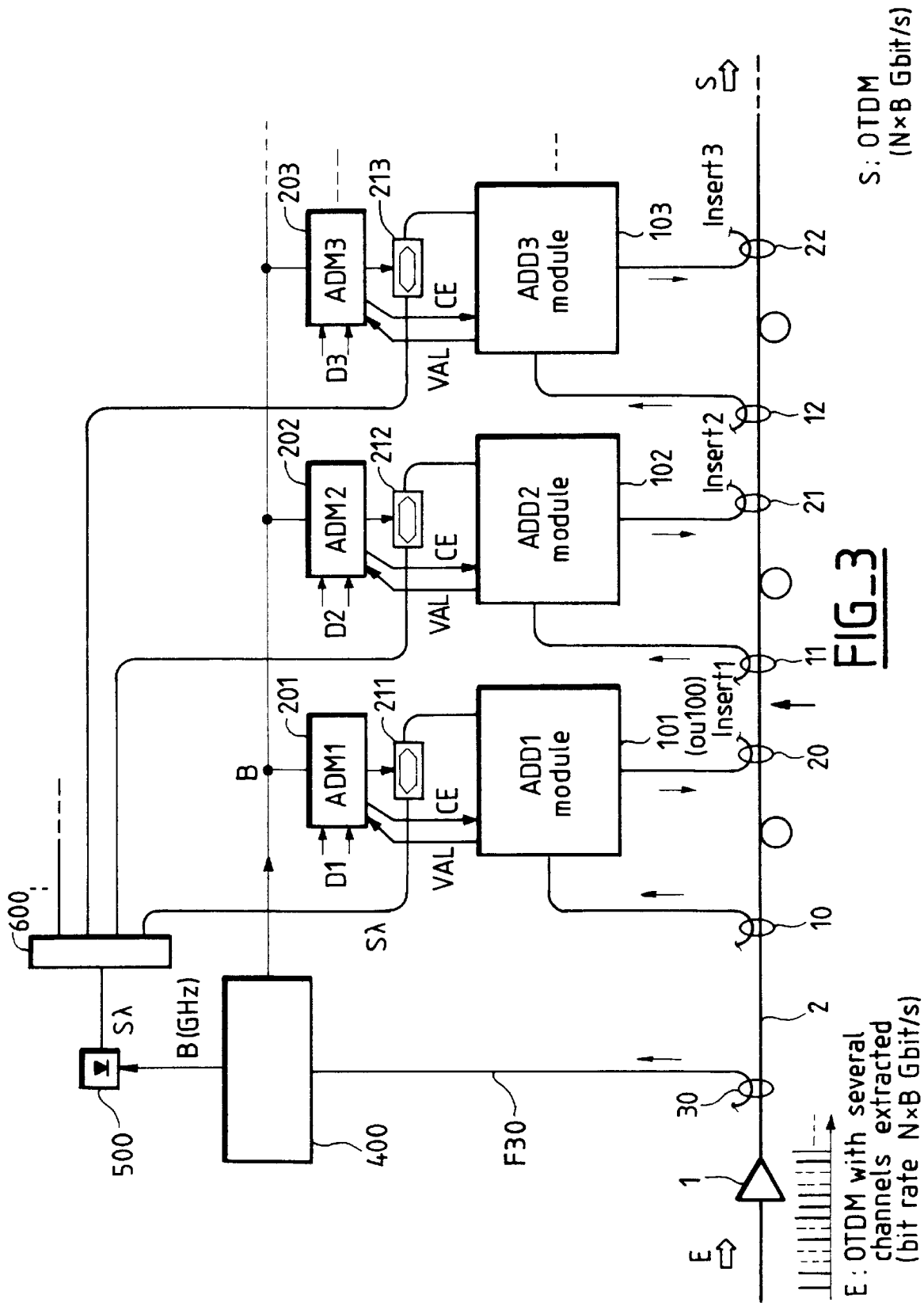

METHOD OF DETECTING ONE OR MORE FREE CHANNELS IN AN OPTICAL TIME-DIVISION MULTIPLEX, A DEVICE FOR IMPLEMENTING IT AND THE USE OF THE DEVICE

FIELD OF THE INVENTION

The invention concerns a method of detecting one or more free (or unoccupied) channels in an optical time-division multiplex, a device for implementing the method, and the use of said device.

The invention applies to communication networks using time-division multiplexing of encoded optical pulse streams (Optical Time Division Multiplex (OTOM)), referred to interchangeably hereinafter as an optical time-division multiplex or a time-division multiplexed optical signal.

BACKGROUND OF THE INVENTION

The switching nodes of communications networks extract and insert information on the incoming multi-plexes in accordance with the routing intended for the information conveyed by the multiplexes.

In the case of time-division multiplex communications networks, in particular networks defined by the SDH (Synchronous Digital Hierarchy) standard, the information is in the form of frames made up of short pulses having a bit rate B (for example 10 Gbit/s) interdigitated bit by bit N times to obtain a resultant signal having a bit rate of N·B (40 Gbit/s to 100 Gbit/s).

When the resulting signal reaches a switching node one or more frames of the signal can be physically extracted from the multiplex by an extraction operation (DROP function), leaving free time slots or channels in the resulting time-division multiplexed signal.

The same switching nodes can also insert information (ADD function) in unoccupied or freed channels of the incoming optical multiplex.

Until now ADD functions have been implemented electronically. To this end all the multiplexed signals have been detected and then stored in buffers so that the frames forming the signals can be reconstituted after processing.

Supervisory logic circuits have re-assigned frames after the DROP and ADD operations.

In the case of optical time-division multiplexes (OTOM) there is no prior art technique for implementing the above functions directly in the optical domain.

One compromise solution demultiplexes all of the optical signals forming the multiplex onto N channels, processes the channels electronically at the transmission or baseband frequency and then reconstitutes an optical time-division multiplexed signal by regenerating each of the basic optical signals by interdigitating them temporally.

The above solution is unsatisfactory because it involves changing from the optical domain to the electronic domain which requires complex and costly drop and add electronic functions in the case of processing bit rates in excess of 10 Gbit/s. For bit rates of 40 Gbit/s the electronic data storage and switching circuits operate at these bit rates directly.

In the optical time-division multiplex situation the above bit rate is achieved with four basic signals at 10 Gbit/s interdigitated to form the 40 Gbit/s multiplex and the data could be processed electronically by 10 Gbit/s circuits. However, this would require the OTDM signal to be demultiplexed and each signal from the multiplex to be processed electronically and independently and reconstituted afterwards.

OBJECTS AND SUMMARY OF THE INVENTION

The present invention solves the above problem by providing a solution that retains the signal in the optical domain during processing in the switching node.

To this end the invention proposes to detect free (or unoccupied) channels of the multiplex. It also proposes to identify the order of each free channel detected. It can also insert the encoded pulses of a new signal into the first free channel that has been detected and identified.

In particular, the invention proposes a method of detecting one or more free channels in a time-division multiplexed optical signal, the method comprising the following steps:

sampling successive optical pulses from at least one of said channels, measuring the average optical power of the sampled pulses during a predetermined time period, and generating a detection signal if said average optical power is less than or equal to a predetermined threshold value.

According to another feature of the invention the method comprises a step of identifying the order of the channels of the multiplex.

The identification step comprises the following steps:

dividing the energy of the multiplexed optical signal to form the same number of optical signals from that signal as there are channels forming the multiplex, and carrying out the sampling, average power measurement and detection signal generation steps for each of said signals.

Advantageously the step of sampling the divided signals is performed using clock signals corresponding to the baseband frequency of the multiplexed optical signals offset relative to each other by a time period corresponding to the width of a channel.

The clock signals are obtained by recovering the baseband frequency B from the optical signals forming the multiplex.

According to another feature of the invention the method further comprises a step of inserting optical pulses of a new signal into the detected free channel.

The insertion step consists in injecting the successive optical pulses of the new signal into the first detected and identified free channel of the multiplex.

If other available channels of the multiplex have been detected, the insertion step consists in repeating all steps of the method as many times as there are free channels for the multiplex.

The invention further concerns a device for detecting and identifying one or more free channels in a time-division multiplexed optical signal, the device comprising:

a coupler having one input and N outputs for dividing the signal from the optical multiplex into the same number of signals as the number of channels forming the multiplex, a circuit for sampling each output signal from the coupler clocked by a respective clock signal corresponding to the baseband frequency of the multiplexed optical signals and offset relative to each other by a time period corresponding to the width of a channel, a low-frequency detector circuit adapted to measure the average power of the optical pulses during a particular time period of each channel identified by the sampling circuit, and a circuit for generating a signal indicating detection of a free channel if the average power of the optical pulses is less than or equal to a particular threshold.

To this end, the sampling circuit comprises an optical gate on the path of each output signal of the coupler and the detector circuit and a delay line associated with each optical gate to obtain a time-delay between clock signals having a duration corresponding to the width of a channel.

The low-frequency detector and signal generator circuits are constituted by an array of photodiodes each followed by a repeater.

The device further comprises a device for recovering the clock at the baseband frequency B from the multi-plexed optical signals.

The invention also concerns an application of the detector device. This application consists in a system for inserting encoded optical pulses into a time-division multiplexed optical signal. The system comprises at least one insertion module including said detector device.

If the system includes a plurality of insertion modules, the modules are coupled to the line in cascade and the clock recovery circuit is the same for all the modules.

The system advantageously includes a single optical pulse generator source for all the insertion modules.

An insertion module further comprises a logic unit with N inputs and N outputs, each input being connected to an output of the detection signal generator circuit and each output being connected to an optical gate, opening of which is commanded by said output signal, said gates being connected to an optical coupler via a separate optical delay line imposing a relative delay at the output having a duration equal to the width of a channel, said optical gates receiving at another input the encoded optical pulses to be inserted in the first free channel detected.

The logic unit comprises AND gates and NAND gates, or their equivalent, adapted to deliver a signal to command opening of optical gates for the output corresponding to the first free channel detected.

The optical gates are constituted by semiconductor optical amplifiers (SOA) or doped fiber amplifiers (EDFA)

BRIEF DESCRIPTION OF THE DRAWINGS

The invention will be better understood on reading the following description given by way of non-limiting example with reference to the accompanying drawings, in which:

FIG. 1 shows an insertion module including a detector device employing the method of the invention, FIG. 2 shows a particular embodiment of the logic circuit 150 from FIG. 1, and FIG. 3 shows an application insertion system.

MORE DETAILED DESCRIPTION

FIG. 1 shows an insertion module 100. FIG. 3 shows identical modules 101, 102, 103, . . . , 10P.

To simplify the description and the drawings the number of channels chosen for this example is N=4.

The incoming optical time-division multiplex E shown in the figure therefore comprises N=4 channels. The multiplex is transmitted by the optical transmission line 2 and is amplified by an optical amplifier 1 before it enters the module.

A portion of the signal E, amounting to approximately 5% of its energy, is sampled by means of an optical coupler 10 and is injected into a fiber section F1 at the input of the insertion module 100.

The insertion module includes a device 140 (circuits 105, 110, 119–122, 123–126) for detecting one or more free channels of the multiplex E and adapted to:

sample successive optical pulses from at least one of the channels (1–4) of the multiplex, measure the average optical power of the sampled pulses during a predetermined time period, and generate a detection signal if said average optical power is less than or equal to a predetermined threshold value.

A small quantity of energy is also sampled from the incoming optical time-division multiplex E, either directly from the fiber 2 or from the fiber F1, in order to recover the clock signal at the baseband channel frequency B. The (conventional) circuit 4 recovers the clock.

The detector part of the insertion module 100 therefore includes a splitter 105 adapted to receive the signal transmitted by the fiber F1 and to divide it at its output between four optical fibers F3–F6 connected to low-frequency detector photodiodes 119–122.

An optical gate such as an electroabsorption modulator 111–114 is placed on each of the fibers F3–F6, i.e. between each output of the splitter 105 and the associated photodiode 119–122.

Each gate is clocked by the clock signal B after passing through separate delay lines 115–118 imposing a time-delay equal to the width of a channel from one gate to the next. In practice the clock signal is phase-shifted a predetermined amount by the phase-shifter 123 for use by the circuit 110.

The low-frequency (or baseband frequency) array of photodiodes 119–122 is adapted to measure the average power level of the signal on each channel.

The resultant signal obtained at the output of the detector for each channel is applied to the inputs of a logic repeater 123–126 adapted to supply a numerical indication of whether each channel is "free" or "occupied".

The logic is defined such that a repeater "i" has an output fi=0 if the channel "i" is free and fi=1 if the channel is occupied. The output information from the repeaters f1, f2–fN (i.e. f1–f4) is fed to the inputs of a logic unit 150 adapted to generate a decision table R1–RN (i.e. R1–R4) for validating the first free time slot identified.

If one of the outputs R1–R4 is at 1, the corresponding time slot is available.

This is made clear by the appended decision table T.

To simplify the table the example concerns three channels obtained from an optical time-division multiplex.

The logic unit 150 supplies the logic states shown in the table for the outputs R1–R3 according to the various logic states at the inputs f1–f3.

The decision logic 150 is designed to validate the first available channel identified in the optical time-division multiplex sequence.

It comprises a NAND gate 151, an AND gate 152 and an OR gate 153 supplying a signal VAL validating an available channel. Of course, any other combination or type of gate producing the required logic function could be used.

A cycle end signal CE is received for reinitializing the inputs fi to "1".

The output signals R1–R4 of the logic unit 150 are fed to an array of semiconductor optical amplifier (SOA) gates 127–130 followed by separate delay lines 131–134.

The optical gates 127–130 could equally comprise doped fibers (EDFA).

The optical gates also receive at another input the encoded pulses of an optical signal S4 (in this example) to be inserted into the first available channel detected. The signal S4 reaches all the optical gates via an optical coupler 136 having one input and four outputs.

The optical signal made up of encoded pulses is supplied by a laser source 5 operating at a wavelength λ. The signal from the source 5 is modulated by data D from a conventional insertion control electronic module 200. The module 200 controls the insertion of an optical signal into an available channel of the multiplex.

For this purpose the module 200 receives the recovered clock signal B and the signal VAL from the logic circuit 150 that is generated when a free channel has been detected. It is this module that generates the cycle end signal CE for the logic circuit 150 and which is used to perform a "reset" at inputs f1–f4, setting them all to "1".

The delay lines 131–134 can be optical fibers of predetermined length for each of the delays to be imposed.

The delay imposed for each optical line F8 through F11 corresponds to the time position of the detected available channel. For the fourth channel the delay relative to the first channel is equal to three time slots. The delay imposed for one fiber relative to the next one is therefore equal to the duration of a channel.

The encoded pulses of the signal to be inserted therefore reach the free channel of the multiplex E via the (4×1) coupler 135 and the (2×1) coupler 20 on the line 2.

FIG. 3 shows an insertion system in a switching node including a cascade of insertion modules 101–10P (p=3 in the example shown) provided with a detector device 140 in accordance with the invention.

Each module 101–103 is coupled to the line 2 at the input by an optical coupler 10–12 and at the output by an optical coupler 20–22.

The first module 101 inserts the optical pulses of a new signal into the first available channel detected by the detector device 140 in the module.

The second module 102 inserts the optical pulses of another signal into the second detected available channel, and so on for the same number of free channels detected in the multiplex E.

To simplify the implementation and to reduce costs, the same clock signal B is used for all the insertion control modules 201–203 . . . of the system. The clock signal B is obtained by a circuit 400 for recovering the baseband signal clock from the multiplexed optical signals from an optical line F30 coupled by a coupler 30 to the line 2.

The clock B clocks a laser source 500 that supplies a signals λ used to generate the optical pulses of each signal to be inserted in the available channels.

For the same reasons as before, a single laser source is preferably used for all of the system.

The control electronic modules 201–203 receive the clock signal B and data D respective to each new signal. On receiving the signal VAL a module 201 communicates data, D1, D2, D3 to a respective modulator 211, 212, 213 that modulates the optical signals λ that it receives from the source 500 via a (1×N) coupler 600.

TABLE T

Appendix

| f1 f2 f3 | R₁ R₂ R₃ | slots available |
|---|---|---|
| 0 0 0 | 1 0 0 | all three |
| 0 0 1 | 1 0 0 | first two |
| 1 0 0 | 0 1 0 | second and third |
| 0 1 0 | 1 0 0 | first and third |
| 0 1 1 | 1 0 0 | first |
| 1 0 1 | 0 1 0 | second |
| 1 1 0 | 0 0 1 | third |
| 1 1 1 | 0 0 0 | none |

What is claimed is:

1. A method of detecting one or more free channels in a time-division multiplexed optical signal, the method comprising the following steps:
    sampling successive optical pulses from at least one of said channels,
    measuring an average optical power of the sampled pulses during a predetermined time period, and
    generating a detection signal indicating a detection of a free channel if said average optical power is less than or equal to a predetermined threshold value.

2. A detection method according to claim 1, comprising a step of identifying the order of the channels of the time-division multiplexed optical signal.

3. A detection method according to claim 2, wherein the identification step comprises the following steps:
    dividing the energy of the multiplexed optical signal to form the same number of optical signals from that signal as there are channels forming the multiplex, and
    carrying out the sampling, average power measurement and detection signal generation steps for each of said signals.

4. A detection method according to claim 3, wherein the step of sampling the divided signals is performed using clock signals corresponding to a baseband frequency of the time-division multiplexed optical signal and offset relative to each other by a time period corresponding to a width of a channel.

5. A detection method according to claim 4, wherein the clock signals are obtained by recovering the baseband frequency of the optical signals forming the time-division multiplexed optical signal.

6. A detection method according to claim 1, further comprising a step of inserting optical pulses of a new signal into the free channel.

7. A detection method according to claim 6, wherein the step of inserting optical pulses of a new signal into the free channel comprises injecting successive optical pulses of the new signal into the free channel of the time-division multiplexed optical signal which is first detected and identified.

8. A detection method according to claim 6, wherein, when other free channels of the multiplex have been detected, the step of inserting optical pulses of a new signal into the free channel further comprises inserting optical pulses of other new signals into the other free channels.

9. A device for detecting and identifying one or more free channels in a time-division multiplexed optical signal, the device comprising:
    a coupler having one input and a plurality of outputs for dividing the time-division multiplexed optical signal into a plurality of optical signals corresponding to a plurality of channels forming the time-division multiplexed optical signal,
    a sampling circuit for sampling successive optical pulses of the optical signals output from the coupler clocked by clock signals corresponding to a baseband frequency of the time-division multiplexed optical signal and offset relative to each other by a time period corresponding to a width of a channel,
    a low-frequency detector circuit adapted to measure an average power of the optical pulses of each of the optical signals during a particular time period of each channel identified by the sampling circuit, and
    a signal generator circuit for generating a detection signal indicating detection of a free channel if the average power of the optical pulses of at least one of the optical signals is less than or equal to a particular threshold.

10. A detection and identification device according to claim 9, wherein the sampling circuit comprises a plurality of optical gates connected between the outputs of the coupler and the low-frequency detector circuit, and a delay line associated with each optical gate to obtain a time-delay between the clock signals having a duration corresponding to the width of a channel.

11. A detector device according to claim 9, wherein the low-frequency detector circuit comprises an array of photodiodes and the signal generator circuit comprises a plurality of repeaters coupled to the photodiodes.

12. A detector device according to claim 9, further comprising a device for recovering the clock at the baseband frequency from the time-division multiplexed optical signal.

13. An insertion system for inserting encoded optical pulses into a time-division multiplexed optical signal, the insertion system comprising at least one insertion module comprising a detector device for detecting and identifying one or more free channels in a time-division multiplexed optical signal, the detector device comprising:

- a coupler having one input and a plurality of outputs for dividing the time-division multiplexed optical signal into a plurality of optical signals corresponding to a plurality of channels forming the time-division multiplexed optical signal,
- a sampling circuit for sampling successive optical pulses of the optical signals output from the coupler clocked by clock signals corresponding to a baseband frequency of the time-division multiplexed optical signal and offset relative to each other by a time period corresponding to a width of a channel,
- a low-frequency detector circuit adapted to measure an average power of the optical pulses of each of the optical signals during a particular time period of each channel identified by the sampling circuit, and
- a signal generator circuit for generating a detection signal indicating detection of a free channel if the average power of the optical pulses of at least one of the optical signals is less than or equal to a particular threshold.

14. An insertion system according to claim 13, further comprising a plurality of insertion modules connected in cascade to a transmission line of the time-division multiplexed optical signal, and a clock recovery circuit coupled to each of the insertion modules for generating a clock signal corresponding to a baseband frequency of the time-division multiplexed optical signal.

15. An insertion system according to claim 13, including a single source for generating optical pulses for all of the insertion modules.

16. An insertion system according to claim 13, wherein the insertion module further comprises a logic unit with a plurality of inputs and a plurality of outputs, and a plurality of optical gates, wherein the inputs are connected to outputs of the signal generator circuit and the outputs are connected to the optical gates which are controlled the outputs, said optical gates are connected to an optical coupler via optical delay lines imposing a relative delay having a duration equal to the width of a channel, said optical gates receive at another input the encoded optical pulses to be inserted in the first free channel detected.

17. An insertion system according to claim 16, wherein the logic unit comprises a plurality of AND gates and NAND gates adapted to provide a signal for controlling opening of optical gates for the output corresponding to the first free channel detected.

18. An insertion system according to claim 17, wherein the optical gates comprise semiconductor optical amplifiers or doped fiber amplifiers.

* * * * *